United States Patent [19]

Tompkins

[11] 4,434,975

[45] Mar. 6, 1984

[54] ARMORED CATTLE GUARD

[76] Inventor: John W. Tompkins, P.O. Box 8186, Phoenix, Ariz. 85066

[21] Appl. No.: 428,938

[22] Filed: Sep. 30, 1982

[51] Int. Cl.³ .............................................. A01K 3/00
[52] U.S. Cl. .......................................... 256/17; 404/8
[58] Field of Search ....................... 256/14, 17; 404/8; 52/177; 119/28

[56] References Cited

U.S. PATENT DOCUMENTS

| 537,047 | 4/1895 | Landis | 404/8 |
|---|---|---|---|
| 940,432 | 11/1909 | Clifford | 404/8 |
| 1,101,909 | 6/1914 | Dolbear | 404/8 |
| 1,273,612 | 7/1918 | Jabelonsky | 404/8 |
| 2,750,157 | 6/1956 | Van Alsburg | 256/17 |
| 2,876,997 | 3/1959 | Hundahl | 256/14 |
| 4,163,545 | 8/1979 | Ostermiller | 256/17 |

FOREIGN PATENT DOCUMENTS

| 611681 | 7/1926 | France | 404/8 |
|---|---|---|---|
| 2009822 | 6/1979 | United Kingdom | 256/17 |

Primary Examiner—Andrew V. Kundrat
Attorney, Agent, or Firm—Gregory J. Nelson

[57] ABSTRACT

A pre-cast concrete cattle guard having longitudinally extending rails and transversely extending beams. The upper edges of selected rails are armored with a protective metal cap which is securely anchored in the rails.

7 Claims, 11 Drawing Figures

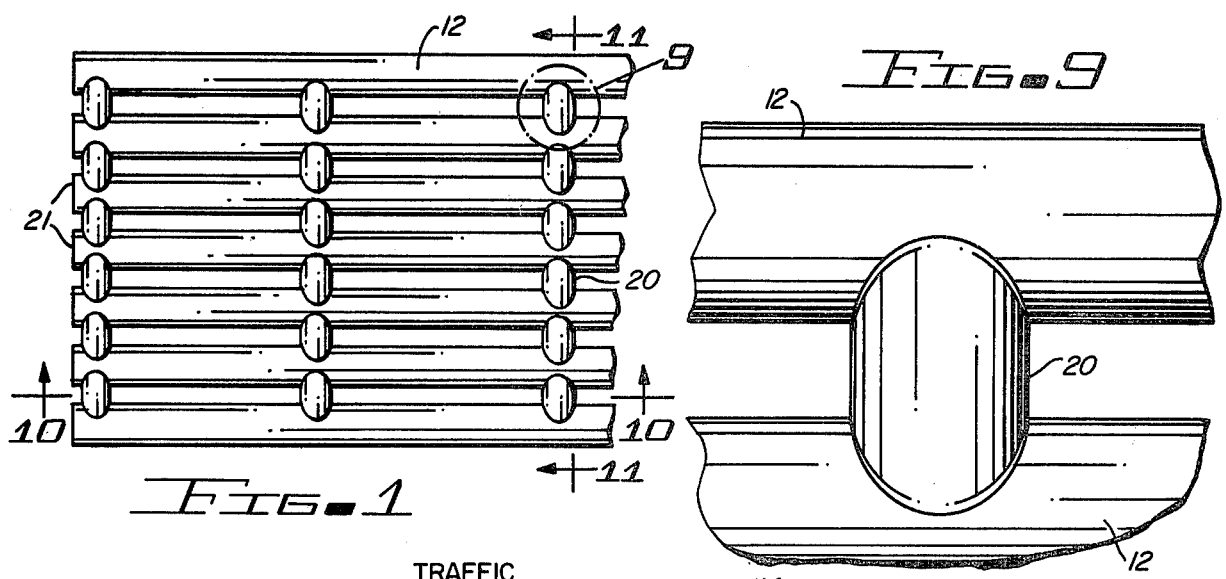
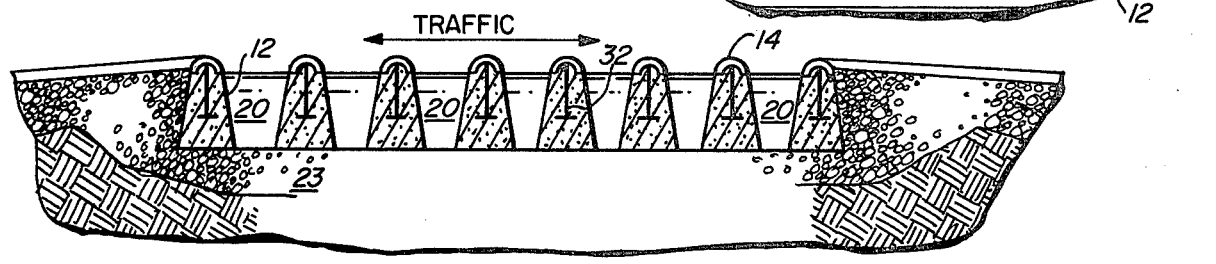
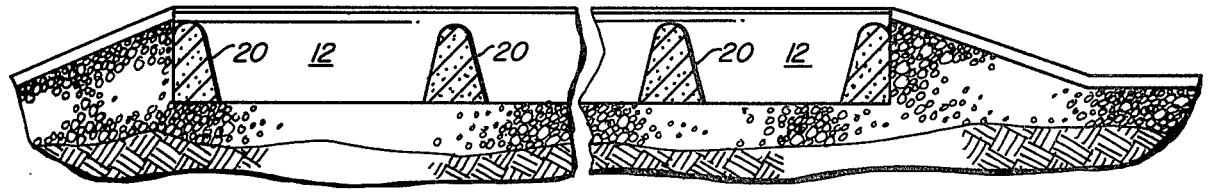
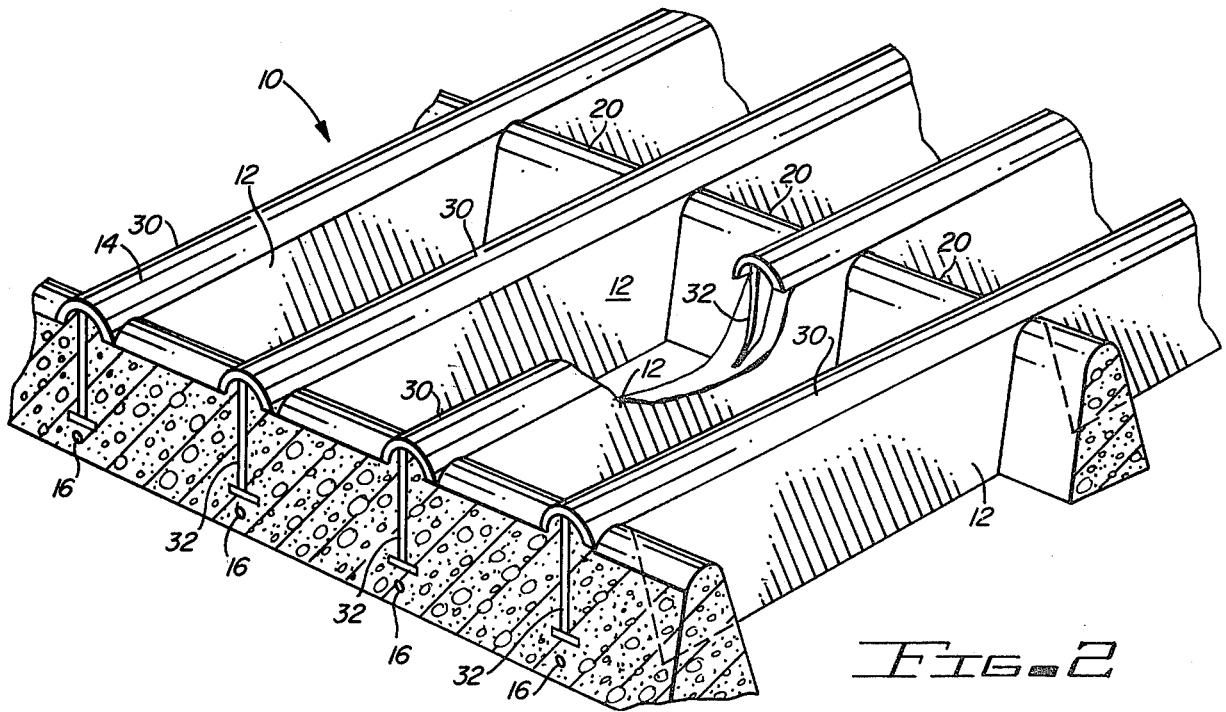

ARMORED CATTLE GUARD

This invention relates to a cattle guard and more particularly to a cast concrete cattle guard armored with a metal cap or nosing.

Cattle guards that permit the passage of a vehicle through a fence while restricting the passage of cattle or other animals across the guard are known. Generally these guards are constructed having a number of parallel spaced-apart pipes arranged in alignment with the fence line and positioned at ground level. An automobile or other vehicle can cross over the pipes but cattle and other animals are prevented from walking across the spaced configuration. This arrangement is an effective form of cattle guard and is usually either prefabricated and delivered to the location or made on the jobsite by welding the components together. However, such construction is expensive to manufacture and if constructed at the jobsite requires considerable labor and equipment including the use of a welder at the time of installation.

Therefore, to minimize the expense involved in construction of a cattleguard, it has become accepted practice in the livestock industry to utilize pre-formed concrete cattle guards. These units are pre-cast from concrete and are reinforced and can be delivered to the jobsite in one piece and set in place. Pre-cast units many times are safer for livestock and result in from twenty to forty percent savings over conventional steel units in material and installation costs. The units can be provided in various lengths or various combinations of pre-cast units are available to form any desired length. Fence posts or wing braces can be attached directly to the grid. The use of such pre-cast units can eliminate extensive excavation in concrete culverts and foundations. For the above reasons, such pre-cast units have become widely used.

Although the pre-cast units have achieved considerable commercial success, it is not uncommon over long periods of use, particularly if the guard grid system is exposed to heavy traffic, for the rails and beams which comprise the grid to become chipped and subject to spalling.

A number of prior art patents show cattle guards of the general pre-cast type. U.S. Pat. No. 4,163,545 shows a concrete cattle guard having parallel support beams and parallel rails arranged transversely of said support beam which utilizes a wedge configuration for stabilizing the rails on the beam. Several patents show reinforced cattle guards having a metal cap or shell. For example, U.S. Pat. Nos. 928,192 and 1,221,286 both show cattle guards of the general type. However, the foregoing cattle guards are proven to be expensive and have not achieved general acceptance in the industry.

Accordingly, it is an object of the present invention to provide an improved pre-cast armored concrete cattle guard which is inexpensive to manufacture and install and which provides superior resistance to wear spalling.

Briefly, the present invention comprehends a pre-cast concrete cattle guard having longitudinally extending rails and transversely extending beams. The upper side of selected rails are provided with armor in the form of a cap or nose of steel, cast-iron or similar metal having superior wear-resistant qualities. The nosing is securely anchored in the concrete at the time the cattle guard is cast.

Other objects and advantages of the present invention will become more apparent from the following description, claims and drawings in which:

FIG. 1 is a partial plan view of a cattle guard according to the present invention;

FIG. 2 is a partial perspective view of a cattle guard according to the present invention;

FIG. 9 is an enlarged detail view as indicated in FIG. 1;

FIG. 10 is a sectional view taken along lines 10—10 of FIG. 1; and

FIG. 11 is a sectional view taken along lines 11—11 of FIG. 1.

Figure 8:
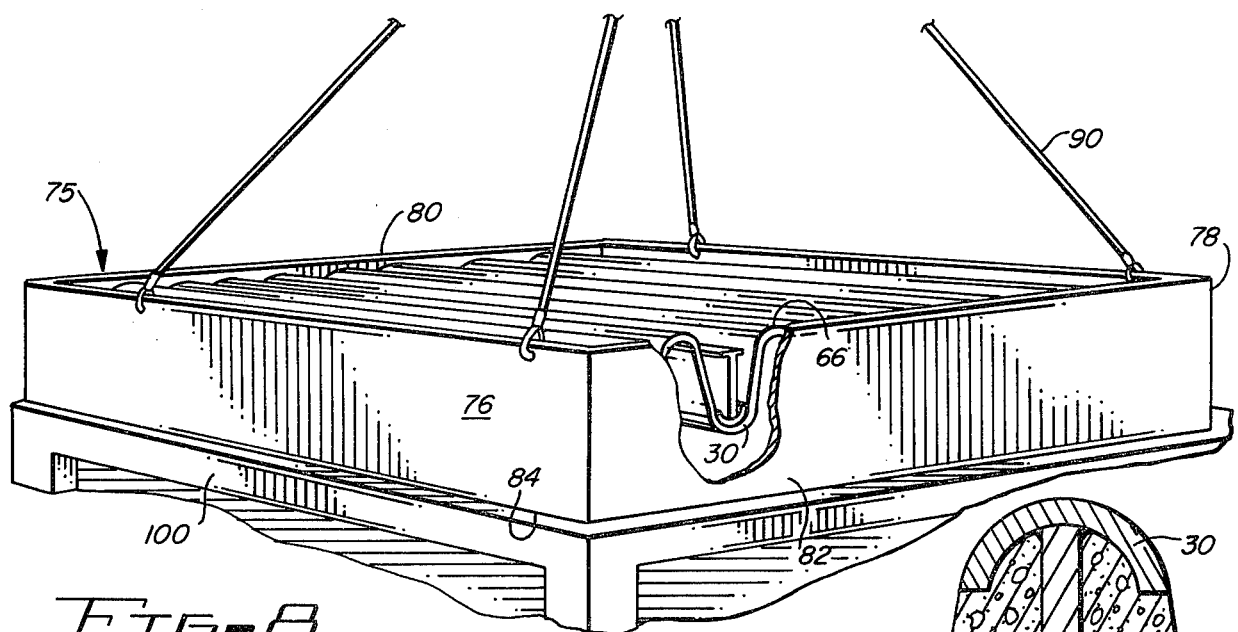
FIG. 8 is a perspective view illustrating the manufacture of pre-cast cattle guards according to the present invention.

Turning now to the drawings in which like characters and reference numbers are used throughout the specification and accompanying drawings to designate corresponding parts, the cattle guard of the present invention is generally designated by the numeral 10 and includes a plurality of longitudinally extending parallel spaced-apart rails 12. Preferably as shown in FIGS. 1, 2, 3, 9, 10 and 11, the individual rails have a generally trapezoidal cross-sectional shape with top surfaces being generally rounded at 14 as shown. The rails may be variously spaced-apart and typically would be placed on approximately eight inch centers. One or more reinforcing rods 16, extends longitudinally within the rails to increase the strength of the rails.

At longitudinally spaced-apart locations, a plurality of beams 20 extend laterally between the rails. The beams 20 complete the structure thus tying the rails 12 and beams 20 together forming an integral pre-cast concrete structure the fabrication of which will be described hereafter. The cattle guard can be formed in various sizes. Typically, the cattle guard 10 would be pre-cast in four foot, eight foot, twelve foot, or sixteen foot lengths. Multiple combinations of these lengths can be joined as desired. As is conventional, the pre-cast unit is delivered to the jobsite and set in place in a roadway with rails 12 extending across the roadway at right angles to the normal flow of traffic as seen in FIG. 10. Generally, the cattle guard is positioned on a suitable base such as a base 23 of six inch compacted ABC. The openings in the cattleguard between the rails form a barrier to prevent stock from crossing. As is conventional, the cattle guard is placed in excavation with the upper surface 14 of the cattle guard positioned at the roadway elevation. Fence post or wing braces, which are conventional, can be attached directly at the opposite ends 21 of the cattle guard.

Figure 5:
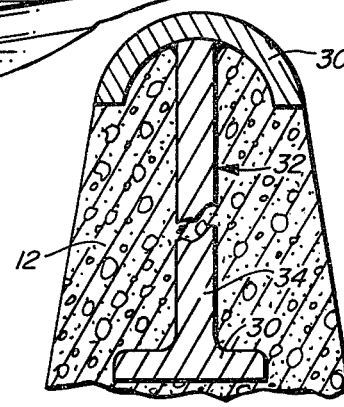
FIG. 5 is a partial sectional view showing the embodiment of FIG. 3.
Figure 3:
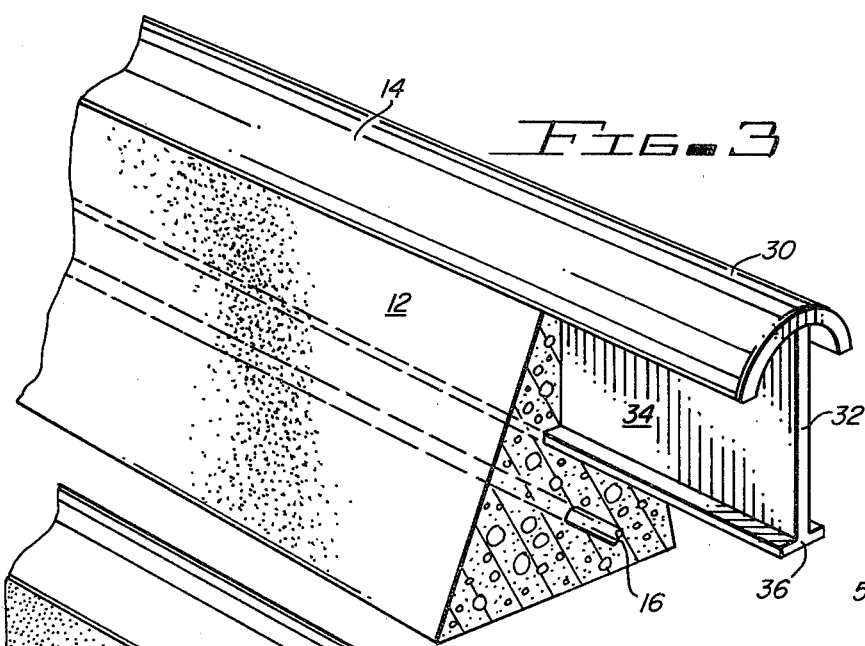
FIG. 3 is a partial perspective view of one of the longitudinal rails illustrating a preferred form of construction.

As best illustrated in FIGS. 2, 3, and 5 the individual rails 12 are provided with a cap or nosing 30 to better improve the wear resistance. Cap 30 extends longitudinally along the upper side 14 of the rail. The cap is shown as generally semi-circular in cross-section and may be of steel, cast-iron or similar material having superior wear-resistance qualities. To fabricate the cap 30, a piece of steel pipe may be split along opposite diametral lines and used for this purpose. Cap 30 is embedded in the concrete having a diameter corresponding to the lateral dimension of the rail at the edge of the cap so that the side edges of the rail are substantially smooth with no rough edges or projections. The cap 30 is secured in place by an anchor member 32 including a vertical web portion 34 and a lower flange 36. The nosing including the cap 30 and anchor 34 are positioned in the beam at the time the beam is cast as will be more fully explained hereafter. The anchor, extending to a substantial depth in the beam secures the cap against dislodgement and forms an integral structural unit with the beam.

Figure 4:
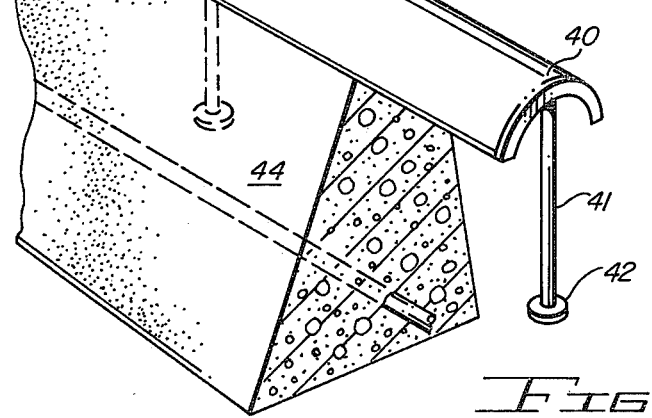
FIG. 4 is a partial perspective view of one of the rails showing an alternate form of construction.

In FIG. 4 a different embodiment is shown in which the metal cap member consists of a longitudinally extending member of semi-circular configuration designated by the numeral 40. Cap 40 is secured to the concrete rail 44 by longitudinally spaced apart anchors shown as studs 41 having an enlarged head 42 embedded in the concrete which provides unitary, structural integrity.

Figure 6:
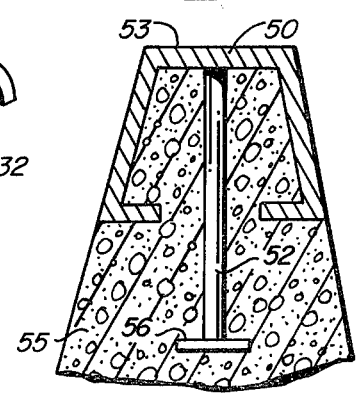
FIG. 6 is a sectional view showing another form of the cattle guard cap of the present invention.

In FIG. 6 another embodiment is illustrated in which the metal cap 50 and anchor portion 52 are secured to rail 55. The cap and anchor have a general trapezoidal shaped configuration with the upper surface 53 of the cap member being substantially flat. Rail 55 has spaced apart depending anchor studs 52 embedded in the concrete structure of the rail. Enlarged anchor head further provides securement.

Figure 7:
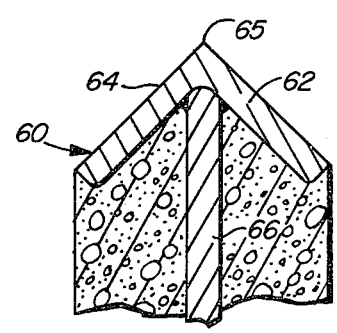
FIG. 7 is a partial sectional view showing another form of the invention.

In FIG. 7, metal cap 60 is shown as having opposite side members 62 and 64 forming an approximate included right angle. Vertically extending anchor member 68 extends downwardly and is embedded in the concrete rail 12 as has been described. Thus, the upper surface of the rail diverges downwardly from the apex 65 of the cap 60 providing a wear-resistant surface.

It will be obvious from the foregoing, that the configuration of the rail and the cap piece can take various shapes. Similarly, the anchor member can be variously constructed and may comprise a continuous web or spaced apart anchor bolts or studs which are welded to the cap and anchored in place in the rail structure.

FIG. 8 illustrates a method by which the cattle guard of the present invention is manufactured. In this figure, a mold form 75 is shown having opposite longitudinal sides 76 and 78, ends 80 and 82, and bottom 84 is supported on a vibrating table 100. The top of the mold form 75 is open. The interior of the mold is subdivided by a plurality of bulkheads 66 which extend longitudinally and laterally to form the rails and beams in an inverted position. Assuming an armored guard of the type shown in FIG. 3 is to be fabricated, the cap sections 30 are positioned in the mold with the anchor member 34 extending vertically in the chamber in which the rails are to be formed. The mold is then poured filling the voids between the bulkheads with wet concrete. Reinforcing rods 16 have been re-positioned by plastic bar chains or are suitably positioned as the pour proceeds. When the pour is completed, preferably the entire mold is then agitated to compact the concrete and remove any voids. This can be done by shaking the entire mold table 100 or by using "stingers" as is conventional in the industry.

Once the concrete is set-up, the completed cattle guard section is removed by cables 90 at suitable embedded lifting lugs, not shown, ready then for transportation to the jobsite. The cap 30 forms the upper surface of the rail that is presented to traffic. The deep anchor is welded to the cap and prevents the anchor from becoming loosened over a period of use and forms a unitary structural member.

Thus, it will be seen that the present invention provides an effective concrete cattle guard which is pre-cast and provides substantial wear resistance as compared to conventional cattle guards. Further, because of the substantial depth to which the cap is anchored in the body of the concrete rail, the cap is securely in place and resists dislodgement. The cattle guard can be cast to any desired shape required by the user.

While several preferred forms of the invention have been illustrated and described, it will be understood that various changes, alterations and modifications may be made to the invention without departing from the spirit and scope of the appended claims. They are intended to be encompassed therein.

I claim:

1. A cattle guard comprising:
   (a) a plurality of pre-cast longitudinally extending rails;
   (b) a plurality of pre-cast concrete beams at longitudinally spaced-apart locations and extending transversely between said rails thereby forming an integral pre-cast unit of rails and beams;
   (c) a metal cap extending longitudinally along the top surface of one or more of said rails; and
   (d) anchor means extending from said cap and embedded within said rails to secure said cap in place, said beams and rails being pre-cast in an inverted position in a mold with said cap and anchor in first position in said mold.

2. The cattle guard of claim 1 wherein said rails are generally of trapezoidal cross-section having a rounded upper surface and said caps having a semi-circular configuration conforming to the top of said rail.

3. The cattle guard of claim 1 wherein said cap consists of a generally flat plate.

4. The cattle guard of claim 1 wherein said cap consists of first and second generally flat plate members intersecting at an apex.

5. The cattle guard of claim 1 wherein said anchor comprises a depending web terminating at a generally transverse flange member.

6. The cattle guard of claim 1 wherein said anchor consists of a plurality of longitudinally spaced-apart studs having an enlarged head embedded in said concrete.

7. The method of making a pre-cast integral concrete cattle guard comprising:
   (a) forming a mold having a plurality of bulkheads therein establishing longitudinally extending rails and transversely extending beams;
   (b) placing said mold in an inverted position;
   (c) placing a metal cap in the bottom of said mold at a location corresponding to the top of the completed cattle guard, said cap including a vertically extending anchor member;
   (d) pouring cementitious material in said mold to form said rails and said beams and to embed said anchor therein;
   (e) allowing the concrete to set; and
   (f) removing the completed cattle guard from the mold.

* * * * *